United States Patent
Roper et al.

(10) Patent No.: US 10,762,245 B2
(45) Date of Patent: Sep. 1, 2020

(54) INPUT PERIPHERAL DEVICE SECURITY

(71) Applicant: NCR Corporation, Duluth, GA (US)

(72) Inventors: Anthony Edward Roper, Dundee (GB); Graham Flett, Dundee (GB)

(73) Assignee: NCR Corporation, Atlanta, GA (US)

(*) Notice: Subject to any disclaimer, the term of this patent is extended or adjusted under 35 U.S.C. 154(b) by 127 days.

(21) Appl. No.: 14/972,778

(22) Filed: Dec. 17, 2015

(65) Prior Publication Data
US 2017/0177908 A1    Jun. 22, 2017

(51) Int. Cl.
G06F 21/83   (2013.01)
G06F 21/44   (2013.01)
G06F 3/06    (2006.01)
G06F 13/42   (2006.01)
H04L 29/06   (2006.01)

(52) U.S. Cl.
CPC ............. G06F 21/83 (2013.01); G06F 3/061 (2013.01); G06F 3/067 (2013.01); G06F 3/0659 (2013.01); G06F 13/4282 (2013.01); G06F 21/44 (2013.01); H04L 63/0853 (2013.01); H04L 63/101 (2013.01); G06F 2221/031 (2013.01); G06F 2221/2101 (2013.01); G06F 2221/2153 (2013.01)

(58) Field of Classification Search
CPC ........ G06F 21/83; G06F 3/0659; G06F 3/061; G06F 3/067; G06F 13/4282; G06F 21/44; H04L 63/0853; H04L 63/101
See application file for complete search history.

(56) References Cited

U.S. PATENT DOCUMENTS

| 4,951,249 | A | * | 8/1990 | McClung | G06F 3/08 340/5.74 |
| 5,223,948 | A | * | 6/1993 | Sakurai | H04N 1/32358 358/404 |
| 5,809,230 | A | * | 9/1998 | Pereira | G06F 21/6218 726/35 |
| 6,288,715 | B1 | * | 9/2001 | Bain | G06Q 10/107 345/211 |
| 7,043,575 | B2 | * | 5/2006 | Stephan | G06F 13/4081 710/10 |

(Continued)

FOREIGN PATENT DOCUMENTS

| CN | 101470411 A | 7/2009 | |
| CN | 104881602 A | 9/2015 | |
| EP | 1429226 A1 * | 6/2004 | G06F 21/85 |

OTHER PUBLICATIONS

NPL Search (Google Scholar) (Year: 2020).*
European Search Report dated Nov. 8, 2016 in co-pending European Patent Applicantion No. 16183650.7.

Primary Examiner — Mahfuzur Rahman
Assistant Examiner — Richard W Cruz-Franqui
(74) Attorney, Agent, or Firm — Schwegman, Lundberg & Woessner

(57) ABSTRACT

An input peripheral agent intercepts input commands on a host machine and enforces policy conditions and whitelist conditions before deciding whether to permit the commands to be processed by an operating system of the host or whether to ignore the commands on the host machine. In an embodiment, the policy conditions and whitelist conditions can be dynamically changed by a remote network manager without changing, stopping, and/or restarting the input peripheral agent and/or the host machine.

17 Claims, 4 Drawing Sheets

(56) References Cited

U.S. PATENT DOCUMENTS

| | | | |
|---|---|---|---|
| 7,562,385 B2* | 7/2009 | Thione | G06F 21/32 726/9 |
| 7,805,531 B2* | 9/2010 | Groll | H04W 12/08 709/229 |
| 8,732,827 B1* | 5/2014 | Zhukov | H04W 12/1208 726/22 |
| 9,154,901 B2* | 10/2015 | Hernandez | H04W 4/00 |
| 9,311,473 B2* | 4/2016 | Han | G06F 21/82 |
| 9,946,866 B2 | 4/2018 | Han et al. | |
| 10,237,280 B2* | 3/2019 | Day, II | H04L 67/22 |
| 2002/0143921 A1* | 10/2002 | Stephan | G06F 13/4081 709/223 |
| 2003/0217287 A1* | 11/2003 | Kruglenko | G06F 21/82 726/19 |
| 2005/0080898 A1* | 4/2005 | Block | G06F 16/9535 709/225 |
| 2005/0138433 A1* | 6/2005 | Linetsky | G06F 21/82 726/19 |
| 2006/0014532 A1* | 1/2006 | Seligmann | G06F 21/6218 455/420 |
| 2006/0026689 A1* | 2/2006 | Barker | G06F 21/31 726/26 |
| 2006/0030263 A1* | 2/2006 | Seligmann | H04L 63/0492 455/41.2 |
| 2006/0150256 A1* | 7/2006 | Fanton | H04L 9/32 726/27 |
| 2006/0152496 A1* | 7/2006 | Knaven | G06F 3/023 345/172 |
| 2006/0206937 A1* | 9/2006 | Repasi | G06F 21/83 726/22 |
| 2008/0068226 A1* | 3/2008 | Sun | G06F 3/0233 341/22 |
| 2008/0301816 A1* | 12/2008 | Ting | H04L 63/0815 726/26 |
| 2011/0276723 A1* | 11/2011 | Elmer | G06F 3/038 710/5 |
| 2012/0221627 A1* | 8/2012 | Sainio | H04L 67/02 709/203 |
| 2012/0222107 A1* | 8/2012 | Sainio | H04L 63/10 726/12 |
| 2012/0255010 A1* | 10/2012 | Sallam | H04L 63/1408 726/24 |
| 2012/0331534 A1* | 12/2012 | Smith | G06F 21/41 726/6 |
| 2013/0173671 A1* | 7/2013 | Jager | G06F 16/907 707/803 |
| 2013/0283371 A1* | 10/2013 | Sitbon | G06F 21/44 726/17 |
| 2014/0108821 A1* | 4/2014 | Lloyd | H04L 63/105 713/189 |
| 2014/0123208 A1* | 5/2014 | Plagemann | G06F 21/629 726/1 |
| 2015/0031416 A1* | 1/2015 | Labowicz | H04M 1/271 455/563 |
| 2015/0244811 A1* | 8/2015 | Zhu | G06F 21/00 709/228 |
| 2015/0248549 A1* | 9/2015 | Han | G06F 21/44 726/19 |
| 2015/0339475 A1* | 11/2015 | Feroz | G06F 21/53 726/23 |
| 2015/0365237 A1* | 12/2015 | Soffer | G06F 21/85 726/20 |
| 2016/0042175 A1* | 2/2016 | Boodaei | G06F 21/83 726/22 |
| 2016/0196220 A1* | 7/2016 | Perez | G06F 21/44 710/73 |
| 2016/0294703 A1* | 10/2016 | Langton | H04L 63/1441 |
| 2017/0177908 A1* | 6/2017 | Roper | H04L 63/0853 |

* cited by examiner

INPUT PERIPHERAL DEVICE SECURITY

BACKGROUND

Automated Teller Machines (ATM) are in general believed to be relatively secure devices since they handle consumer financial transactions. However, ATMs are susceptible to malware, viruses, and eavesdropping just like any other device having memory and processor capabilities.

Modern ATMs often include peripheral ports or wireless technologies (such as WiFi, Bluetooth®, etc.) which may permit peripheral or device pairing with the ATMs. Generally, the wireless technologies are secured through encryption keys. The peripheral ports may be hidden out of typical sight but service engineers know here the ports are at and how to access them and some ingenious hackers may know how to gain access to the ports.

One particular peripheral that may be beneficial to connect to an ATM for legitimate reasons and/or malicious reasons is a keyboard. With a keyboard a service engineer can use keys or key sequences to access resources or run programs on the ATM, which may be unavailable via a typical touchscreen of existing limited encrypted PINPAD.

However, because keys and key sequences can bypass some security checks and directly access resources that can be detrimental to the security of the ATM. Some ATM security systems will block all users from certain keys or key sequences through the operating system's (OS's) registry. However, this approach is too rigid since an authorized user of the ATM may have a legitimate need to access the blocked keys or key sequences).

Therefore there is a need for improved finer-grain security associated with keys and key sequences of peripheral keyboards attached to a host machine.

SUMMARY

In various embodiments, methods and a Self-Service Terminal for input peripheral device security are presented.

According to an embodiment, a method for input peripheral device security is presented. Specifically, an input command generated from an input peripheral of a host machine is intercepted. Then, a determination is made as to whether to block the input command from being processed by an Operating System (OS) of the host machine or whether to pass the input command to the OS for processing.

DETAILED DESCRIPTION

Figure 1:
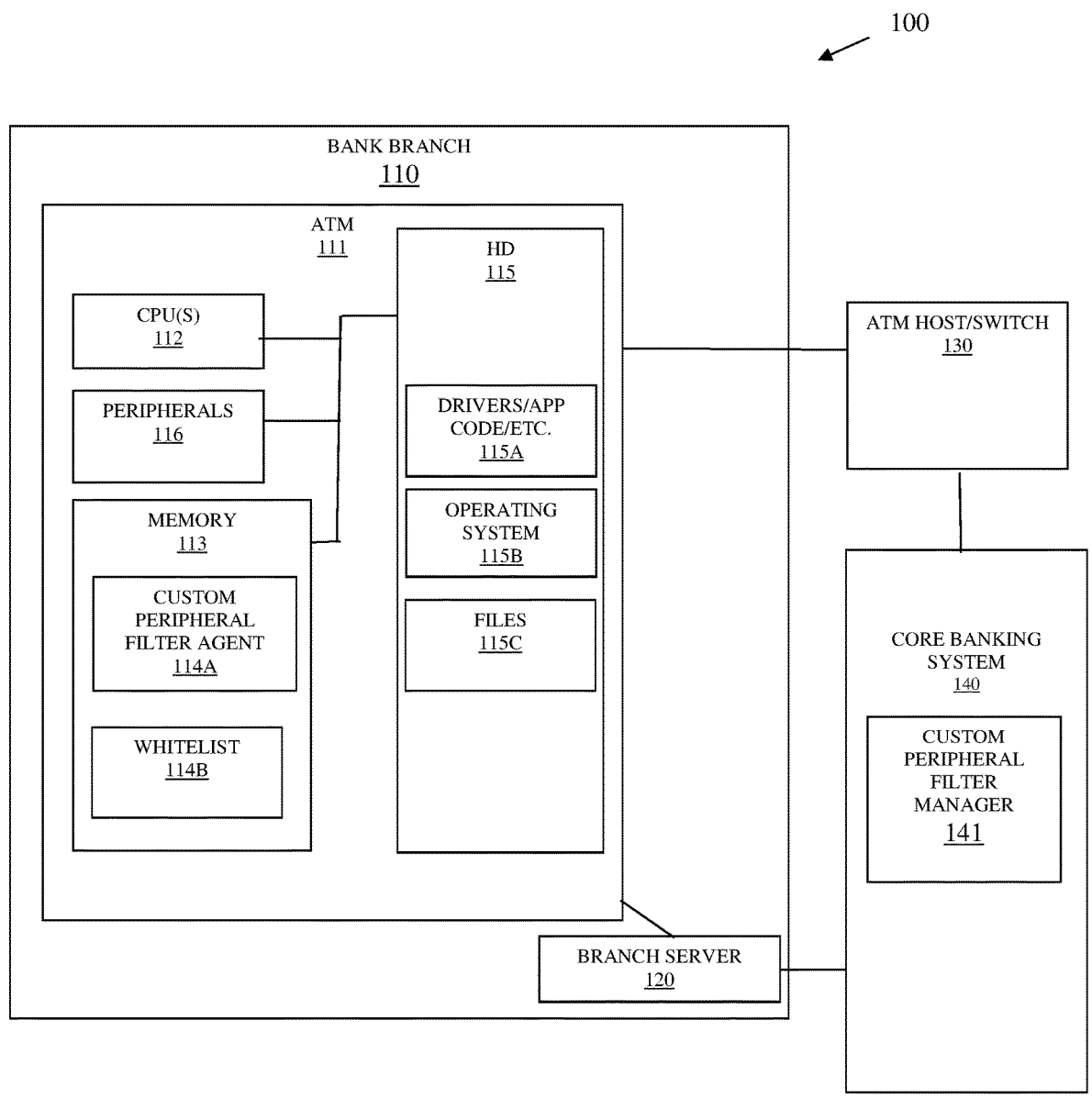
FIG. 1 is a diagram of a banking system for keyboard security on an Automated Teller Machine (ATM), according to an example embodiment.

FIG. 1 is a diagram of a banking system for keyboard security on an Automated Teller Machine (ATM), according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of input peripheral device security, presented herein and below.

The banking system 100 includes a bank branch 110, an ATM host/switch 130, and a core banking system 140. The bank branch 110 includes: an ATM 111 and a branch server 120.

The ATM 111 includes one or more Central Processing Units (CPU(s) 112, memory 113, and a Hard Drive (HD) 115 (which may or may not be encrypted and dynamically decrypted as needed), and multiple peripheral devices 116. The memory 113 includes new and novel custom peripheral filter agent 114A as a running instance of executable instructions processed from the memory 113 by the one or more CPUs 112 on the ATM 111. The HD 115 includes drivers/application code/etc. 115A, an operating system (OS) 115B, and files 115C. The application code 115A may include the source code for the custom peripheral agent 114.

On ATM 111 boot, the OS 115B is loaded from the HD 115 into the memory 113 and executed by the one or more CPUs 112, the OS 115B when loaded to memory 113 loads the executable version of the custom peripheral filter agent 114A into memory 113 along with the peripheral drivers 115A. The custom peripheral filter agent 114B loads from the files 115C a novel whitelist 114B into memory (cache).

The custom peripheral filter agent 114B can communicated over a network connection from the ATM 111 to the branch server (such as through a Local Area Network (LAN) connection. Through the branch server 120 a Wide Area Network (WAN) connection is available to the custom peripheral filter agent 114A for two-way communication with the custom peripheral filter manager 141 of the core banking system 140.

The custom peripheral filter manager 141 may also change information present in the whitelist 114B through communication with the custom peripheral filter agent or by replacement of the a file representing the whitelist 114B in the files 115C of the hard drive when the customer peripheral filter agent 114A is not loaded and running in memory 112 of the ATM 111.

During operation, the custom peripheral filter agent 114A is configured to detect key events and key sequences from a detected keyboard peripheral 116 interfaced to the ATM 111. This can be done through listening to the port to which the keyboard peripheral 116 is interfaced to the ATM 111 (such as through a Universal Serial Bus (USB port) or other port including a wireless communication port) and/or monitoring commands being sent to and from a device driver associated with the keyboard peripheral 116.

Any key events (can include key sequences) or key commands detected are intercepted from the device driver before being handled by the OS 115B and compared by the custom peripheral filter agent 114A to entries in the whitelist 114B. If a match for an entry in the whitelist 114B is found, then the key event or key command is allowed to pass to the OS 115B for normal handling on the ATM 111. However, if no match is found for an entry in the whitelist 114B with the intercepted key event or key command, the key event or key command is not passed to the OS 115B for handling; essentially the intercepted key even or key command is filtered, ignored and results in no action whatsoever on the ATM 111.

Because processing actions of the custom peripheral filter agent 114A is driven from the whitelist 114B when new keyboards are deployed only known and certified keys or key sequences can be added in the whitelist 114B and the custom peripheral filter agent 114A does not need modified, recompiled, or changed in any way. In this sense, the custom peripheral filter agent 114A is dynamically customizable and reactive. Moreover, unlike other approaches that rely on identifying keys or key sequences that are to be excluded by utilizing a novel whitelist approach, any unknown and uncertified keys or keys sequences are by default filtered and ignored by the custom peripheral filter agent 114A because only acceptable keys or key sequences are present and allowed to proceed if present in the whitelist 114B.

Moreover, since the custom peripheral filter manager 141 has access to change the whitelist 114B new keys or key sequences can be dynamically and remotely added or existing keys or key sequences present in the whitelist 114B can be dynamically deleted and thereby filtered and ignored because their presence is removed from the whitelist 114B.

A variety of security conditions with respect to the detected key events can be defined in either the whitelist 114B or a separate configuration file obtained from the files 115C and dynamically interpreted by the custom peripheral filter agent 114A. These conditions may be referenced in collections as a specific policy and each policy may be located based on an identity of a resource that triggers the key event or key sequences. For example, a service engineer authenticates via a login procedure and is represented as a unique identity associated with that service engineer. When the key event is intercepted by the custom peripheral filter agent 114A, metadata available from the OS 115B can identify the authenticated service engineer's identity, which the custom peripheral filter agent 114A locates in a configuration file or the whitelist associated with a condition or a set of conditions referenced as a policy. Those conditions can be evaluated to determine that even if a key event match is found in the whitelist 114B, the key event is to be ignored or filtered and not passed to the OS 115B for handling.

In this manner, the custom peripheral filter agent 114A can deploy fine grain and resource specific key command filtering, which can be dynamically changed through changes to entries in the whitelist 114B and/or the configuration file and which can be changed over a network by the custom peripheral filter manager 141.

This provides a variety of beneficial usages such as but not limited to:

1) changes to the filtered keys can come from the remote network-based custom peripheral filter manager 141;

2) changes to be made to which keys in the whitelist 114B can be permitted based on a server engineer's authorization (identity which may be based on a secure USB dongle have a serial number known to be assigned to a specific service engineer);

3) keyboard filter changes can be dynamically made without requiring any registry entries in the OS and without requiring the ATM 111 to reboot; and 4) keyboard filtering can be remotely managed from the custom peripheral filter manager 141 and/or through configuration conditions or policies, such that filtering can be turned off during an engineer service ticket window and turned back on when the time is outside the service ticket window;

In an embodiment, the conditions are based on an automated software resource rather than a user resource (service engineer).

In an embodiment, the conditions are integrated into the whitelist 114B as one file or a database.

In an embodiment, the keyboard peripheral 116 is a Bluetooth® keyboard.

In an embodiment, the keyboard peripheral 116 is a device operated by the service engineer than can pose as a keyboard for the ATM 111, such as a laptop, a tablet, a phone, or a wearable processing device configured to identify itself over a peripheral communication port to the ATM 111 as a type of keyboard peripheral 116.

In an embodiment, the whitelist groups whitelisted key entries based on a keyboard type, such that multiple different keyboard types are identified and managed in a single whitelist file or database 114B.

In an embodiment, each separate keyboard type includes its own separate whitelist file or database 114B. In such a case, an identifier for the keyboard type may be used as the file name or file reference for each whitelist file 114B, such that when the custom peripheral filter agent 114A detects and event for a given keyboard type, the keyboard type/identifier can be processed by the custom peripheral filter agent 114A to locate and retrieve the proper whitelist file 114A from the files 115C on the hard drive 115

Some of embodiments of the FIG. 1 and other embodiments are now discussed with reference to the FIGS. 2-4.

Figure 2:
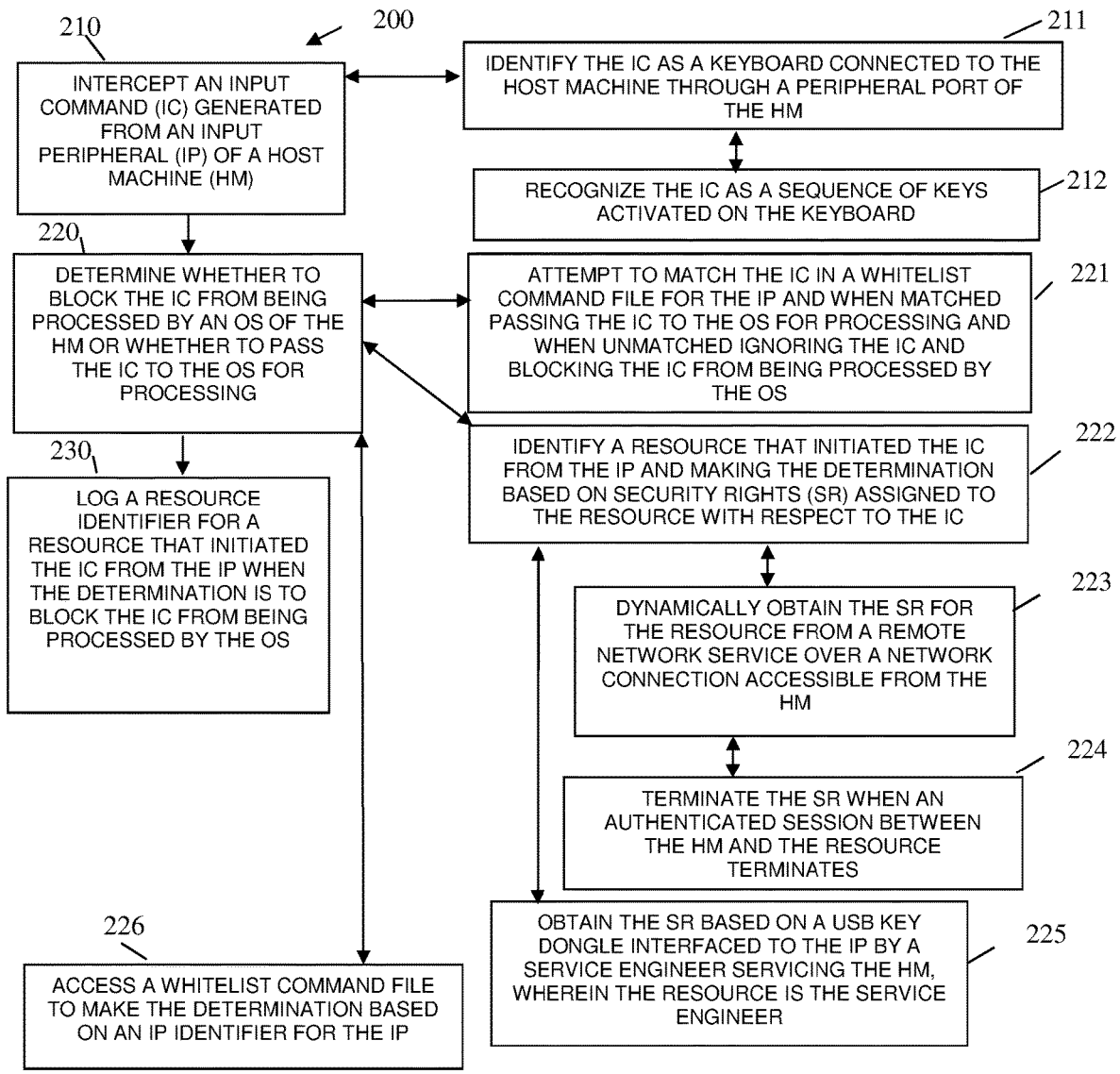
FIG. 2 is a diagram of a method for input peripheral device security, according to an example embodiment.

FIG. 2 is a diagram of a method 200 for input peripheral device security, according to an example embodiment. The software module(s) that implements the method 200 is referred to as a "Self-Service Terminal (SST) input device filtering agent." The SST input device filtering agent is implemented as executable instructions programmed and residing within memory and/or a non-transitory computer-readable (processor-readable) storage medium and executed by one or more processors of a device. The processor(s) of the device that executes the SST input device filtering agent are specifically configured and programmed to process the SST input device filtering agent. The SST input device filtering agent has access to one or more network connections during its processing. The network connections can be wired, wireless, or a combination of wired and wireless.

In an embodiment, the device that executes the SST input device filtering agent is the ATM 111 of the FIG. 1.

In an embodiment, the device that executes the SST input device filtering agent is a kiosk.

In an embodiment, the device that executes the SST input device filtering agent is a Point-Of-Sale (POS) terminal.

In an embodiment, the SST input device filtering agent is the custom peripheral filter agent 114A of the FIG. 1.

In an embodiment, the custom peripheral filter manager 141 is operable to custom-drive and alter the dynamic processing of the SST input device filtering agent without restarting the SST and without altering or modifying the executable instructions of the SST input device filtering agent.

At 210, the SST input device filtering agent intercepts an input command generated from an input peripheral of a host machine.

In an embodiment, the SST input device filtering agent hooks into the kernel of the OS to permit intercepting of the input commands emanating from a device driver for the input peripheral. In an embodiment, the hook is a registration with an OS kernel process to pass the input commands from all input peripherals to the SST input device filtering agent.

In an embodiment, the host machine is the ATM 111 of the FIG. 1.

In an embodiment, the host machine is an SST. In an embodiment, the SST is a kiosk.

In an embodiment, at 211, the SST input device filtering agent identifies the input command as a keyboard connected to the host machine through a peripheral port of the host machine.

In an embodiment of 211 and at 212, the SST input device filtering agent recognizes the input command as a sequence of keys activated on the keyboard. In an embodiment the sequence is a single key. In an embodiment the sequence is two or more keys.

At 220, the SST input device filtering agent determines whether to block the input command from being processed by an OS of the host machine or whether to pass the input command to the OS for processing.

In an embodiment, at 221, the SST input device filtering agent attempts to match the input command to a whitelist command file for the input peripheral and when matched, the SST input device filtering agent passes the input command to the OS for processing and when unmatched, the SST input device filtering agent ignores the input command and blocks the input command from being processed by the OS. In an embodiment, the whitelist command file is the whitelist file 114B of the FIG. 1.

In an embodiment, at 222, the SST input device filtering agent identifies a resource that initiated the input command from the input peripheral and the SST input device filtering agent makes the determination based on security rights assigned to the resource with respect to the input command.

In an embodiment, the resource is an operator that operates the input peripheral. In an embodiment, the operator is a service engineer that is servicing the SST.

In an embodiment, the resource is an automated service or application that can initiate the input command as coming from the input peripheral.

In an embodiment of 222 and at 223, the SST input device filtering agent dynamically obtains the security rights for the resource from a remote network service over a network connection accessible from the host machine. In an embodiment, the remote network service is the custom peripheral filter manager 141 of the FIG. 1. In an embodiment, the remote network service is the method 300 discussed with reference to the FIG. 3 below.

In an embodiment of 223 and at 224, the SST input device filtering agent terminates the security rights when an authenticated session between the host machine and the resource terminates. In an embodiment, the authenticated session is for a resource that is a service engineer performing service on the host machine (SST) pursuant to a service ticket.

In an embodiment of 222 and at 225, the SST input device filtering agent obtains the security rights based on a USB key dongle interfaced to the input peripheral by a service engineer servicing the host machine, where the resource is the service engineer.

In embodiment, at 226, the SST input device filtering agent accesses a whitelist command file to make the determination based on an input peripheral identifier for the input peripheral. In an embodiment, the whitelist command file is the whitelist file 114B of the FIG. 1.

In an embodiment, at 230, the SST input device filtering agent logs a resource identifier for a resource that initiated the input command from the input peripheral when the determination is to block the input command from being processed by the OS of the host machine. This can be used for auditing input commands that were unauthorized and attempted on the host machine through the input peripheral.

Figure 3:
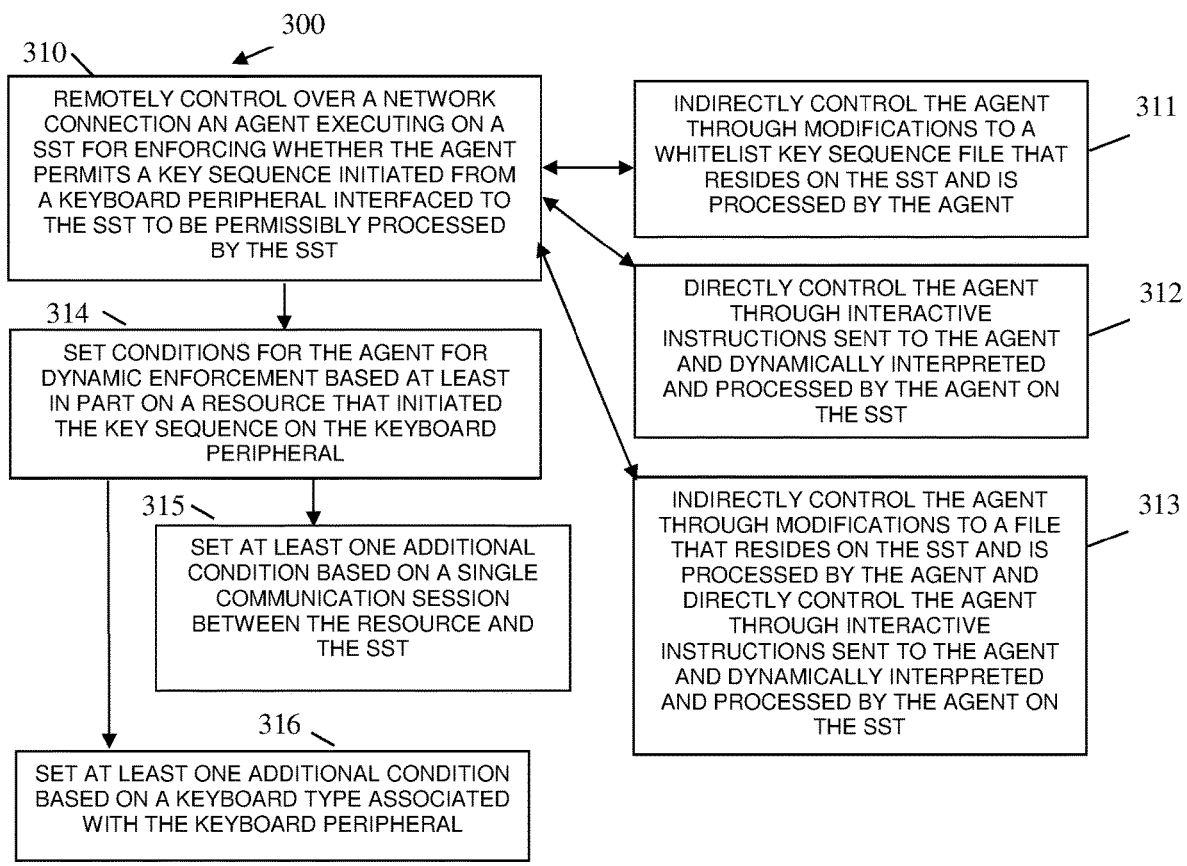
FIG. 3 is a diagram of another method for input peripheral device security, according to an example embodiment.

FIG. 3 is a diagram of another method 300 for input peripheral device security, according to an example embodiment. The software module(s) that implements the method 300 is referred to as an "SST input device filter manager." The SST input device filter manager is implemented as executable instructions programmed and residing within memory and/or a non-transitory computer-readable (processor-readable) storage medium and executed by one or more processors of a device. The processors that execute the SST input device filter manager are specifically configured and programmed to process the SST input device filter manager. The SST input device filter manager has access to one or more network connections during its processing. The network connections can be wired, wireless, or a combination of wired and wireless.

In an embodiment, the device that executes the SST input device filter manager is a server. In an embodiment, the server is the core banking system 140 of the FIG. 1.

In an embodiment, the device that executes the SST input device filter manager is an SST that is networked to another SST having an instance of the customer peripheral filter agent 114A of the FIG. 1 or an instance of the method 200 of the FIG. 2.

In an embodiment, the SST input device filter manager is the custom peripheral filter manager 141 of the FIG. 1.

In an embodiment, the SST input device filter manager interacts with the custom peripheral filter agent 114A of the FIG. 1 or the method 200 of the FIG. 2.

In an embodiment, the SST input device filter manager directly interacts with the customer peripheral filter agent 114A of the FIG. 1 or the method 200 of the FIG. 2.

In an embodiment, the SST input device filter manager indirectly interacts with the customer peripheral filter agent 114A of the FIG. 1 or the method 200 of the FIG. 2 through changes to one or more files, such as the whitelist file 114B and/or configuration files discussed with reference to the FIG. 1.

In an embodiment, the SST input device filter manager directly interacts and indirectly interacts with the customer peripheral filter agent 114A of the FIG. 1 or the method 200 of the FIG. 2.

At 310, the SST input device filter manager remotely controls, over a network connection, an agent executing on an SST for enforcing whether the agent permits a key sequence initiated from a keyboard peripheral interfaced to the SST to be processed by the SST.

In an embodiment, the agent is the custom peripheral filter agent 114A of the FIG. 1.

In an embodiment, the agent is the method 200 of the FIG. 2.

In an embodiment, the SST is the ATM 111 of the FIG. 1.

In an embodiment, the SST is a kiosk.

In an embodiment, the SST is a POS terminal.

According to an embodiment, at 311, the SST input device filter manager controls the agent through modifications to a whitelist key sequence file that resides on the SST and is processed by the agent.

In an embodiment, the whitelist key sequence file is the whitelist file 114B of the FIG. 1.

In an embodiment, at 312, the SST input device filter manager directly controls the agent through interactive instructions sent to the agent and dynamically interpreted and processed by the agent on the SST.

In an embodiment, at 313, the SST input device filter manager indirectly controls the agent through modifications to a file that resides on the SST and is processed by the agent and directly controls the agent through interactive instructions sent to the agent and dynamically interpreted and processed by the agent on the SST. In an embodiment, the file is the whitelist file 114B of the FIG. 1.

In an embodiment, at 314, the SST input device filter manager sets conditions for the agent for dynamic enforcement base at least in part on a resource that initiated the key sequence on the keyboard peripheral.

In an embodiment of 314 and at 315, the SST input device filter manager sets at least one additional condition based on a single communication session between the resource and the SST.

In an embodiment of 314 and at 316, the SST input device filter manager sets at least one additional condition based on a keyboard type associated with the keyboard peripheral.

Figure 4:
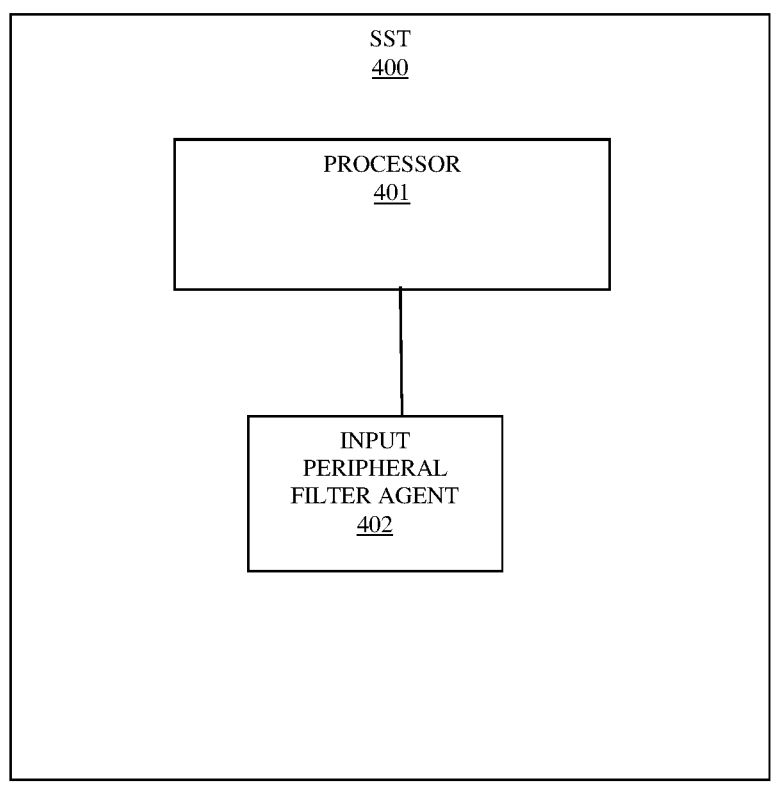
FIG. 4 is a diagram of a Self-Service Terminal (SST), according to an example embodiment.

FIG. 4 is a diagram of a SST 400, according to an example embodiment. The SST 400 includes a variety of hardware components and software components. The software components of the SST 400 are programmed and reside within memory and/or a non-transitory computer-readable medium and execute on one or more processors of the SST 400. The SST 400 may communicate over one or more networks, which can be wired, wireless, or a combination of wired and wireless.

In an embodiment, the SST 400 is the ATM 111 of the FIG. 1.

In an embodiment, the SST 400 is a kiosk.

In an embodiment, the SST 400 is a POS terminal.

The SST 400 includes a processor 401 and an input peripheral filter agent 402.

The input peripheral filter agent 402 is adapted and configured to: execute on the processor 401.

In an embodiment, the input peripheral filter agent 402 is the custom peripheral filter agent 114A of the FIG. 1.

In an embodiment, the input peripheral filter agent 402 is the method 200 of the FIG. 2.

In an embodiment, the input peripheral filter agent 402 is further configured to: 1) execute on the processor 401 of the SST 400 and 2) determine whether to pass an input command initiated from an input peripheral to an OS of the SST 400 for processing or whether to block the input command from being passed to the OS for processing.

In an embodiment, the input peripheral filter agent 402 is further configured to make the determination based on entries included in a whitelist input command file. In an embodiment, the whitelist input command file is the whitelist file 114B of the FIG. 1.

In an embodiment, the SST 400 is the ATM 111 of the FIG. 1 and a remote network service accessible over a network connection to the ATM 111 at least partially controls the entries to the whitelist input command file over the network connection. In an embodiment, the remote network service is the custom peripheral filter manager 141 of the FIG. 1. In an embodiment, the remote network service is the method 300 of the FIG. 3.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:

loading, into memory of a host machine, executable instructions from a non-transitory computer-readable storage medium as a custom peripheral filter agent on boot of the host machine;

executing, by a processor on the host machine, the custom peripheral filter agent;

loading, by the custom peripheral filter agent, into cache of the host machine a whitelist;

intercepting, by the custom peripheral filter agent, an input command generated from an input peripheral of the host machine by monitoring a communication port on the host machine associated with the input peripheral, wherein intercepting further includes obtaining the input command before the input command is received from the communication port by an Operating System (OS) of the host machine, wherein intercepting further includes obtaining the input command from a device driver associated with the input peripheral using an OS kernel process;

determining, by the custom peripheral filter agent, whether to block the input command from being processed by the OS when the input command is unknown or whether to pass the input command to the OS for processing based on entries in the whitelist, wherein determining further includes ignoring the input command by not passing the input command to the OS for processing when the input command is not identified in the entries of the whitelist, wherein determining further includes identifying an identity of a resource that initiated the input command from the OS, obtaining a policy associated with the identity from the whitelist, evaluating one or more conditions associated with the policy and determining based on the evaluating of the one or more conditions not to pass the input command to the OS for processing even when the input command is identified in a particular entry of the whitelist and is authorized based on the identity of the resource and the one or more conditions;

permitting, by the custom peripheral filter agent, only authorized commands identified in the entries of the whitelist and indicated as authorized by the one or more conditions to be processed by the OS of the host machine; and changing the entries of the whitelist without modifying, recompiling, and stopping execution of the custom peripheral filter agent, and enforcing changed entries to the whitelist without rebooting the host machine and without requiring any changes to a registry associated with the host machine.

2. The method of claim 1, wherein intercepting further includes identifying the input command as a keyboard connected to the host machine through a peripheral port of the host machine.

3. The method of claim 2, wherein identifying further includes recognizing the input command as a sequence of keys activated on the keyboard.

4. The method of claim 1, wherein determining further includes attempting to match the input command to an entry of the whitelist maintained in the cache for the input peripheral, and when matched passing the input command to the OS for processing, and when unmatched ignoring the input command and blocking the input command from being processed by the OS.

5. The method of claim 1, wherein identifying further includes dynamically obtaining security rights as the one or more conditions for the policy from a remote network service over a network connection accessible from the host machine.

6. The method of claim 5, wherein dynamically obtaining further includes terminating the security rights when an authenticated session between the host machine and the resource terminates.

7. The method of claim 1, identifying further includes obtaining security rights as the one or more conditions based on a Universal Serial Bus (USB) key dongle interfaced to the input peripheral by a service engineer servicing the host machine, wherein the resource is the service engineer.

8. The method of claim 1, wherein determining further includes accessing the whitelist to make the determination based on an input peripheral identifier for the input peripheral.

9. The method of claim 1 further comprising, by the custom peripheral filter agent, logging a resource identifier for the resource that initiated the input command from the input peripheral when the determination is to block the input command from being processed by the OS.

10. A method, comprising:
  remotely controlling, by executable instructions that execute on a processor from a non-transitory computer-readable storage medium and over a network connection, an agent executing on a Self-Service Terminal (SST) for enforcing whether the agent permits a key sequence initiated from a keyboard peripheral interfaced to the SST to be permissibly processed by the SST, wherein the agent monitors a communication port for the keyboard peripheral on the SST and intercepts the key sequence from a device driver associated with the keyboard peripheral using an Operating System (OS) kernel process of the SST before the key sequence is processed by an OS of the SST and receiving from the agent over the network connection the key sequence and based on the key sequence instructing the agent over the network connection to pass the key sequence to the OS for processing when the key sequence is authorized and to ignore the key sequence by blocking the key sequence from being passed to the OS on the SST for processing when the key sequence is unauthorized based on the key sequence being unknown, and when a determination is made to pass the key sequence to the OS:
  1) obtaining an identity of a resource that initiated the key sequence from the keyboard peripheral from the agent, wherein the agent obtains the identity from the OS,
  2) obtaining a policy associated with the identity,
  3) enforcing one or more conditions associated with the policy to determine whether to instruct the agent to pass the key sequence to the OS or whether to instruct the agent to block the OS from receiving the key sequence, and
  4) determining based on the enforcing of the one or more conditions not to pass the key sequence to the OS for processing even when the key sequence is authorized based on the identity of the resource and the one or more conditions;
  permitting, by the agent, only authorized key sequences that are authorized by the executable instructions over the network connection to be processed by the OS of the SST during operation of the SST; and
  changing, by the executable instructions, the authorized key sequences without modifying, recompiling, and stopping execution of the agent on the SST, and enforcing changed authorized key sequences on the SST without rebooting the SST and without requiring any changes to a registry associated with the SST.

11. The method of claim 10, wherein remotely controlling further includes directly controlling the agent through interactive instructions sent to the agent and dynamically interpreted and processed by the agent on the SST.

12. The method of claim 10, wherein remotely controlling further includes setting the one or more conditions for the agent for dynamic enforcement based the identity of the resource that initiated the key sequence on the keyboard peripheral.

13. The method of claim 12, wherein setting further includes setting at least one additional condition based on a single communication session between the resource and the SST.

14. The method of claim 12, wherein setting further includes setting at least one additional condition based on a keyboard type associated with the keyboard peripheral.

15. A Self-Service Terminal (SST), comprising:
  a hardware processor programmed with executable instructions residing in a non- transitory computer-readable storage medium, the executable instructions representing an input peripheral agent; and
  the input peripheral agent executes on the hardware processor and is configured to perform processing to:
    determine whether to pass an input command initiated from an input peripheral and communicated from a device driver of the input peripheral to an Operating System (OS) of the SST for processing using an OS kernel process or whether to block the input command from being passed to the OS for processing based on the input command being unknown by monitoring a communication port of the input peripheral and monitoring the device driver,
    when a determination is made to pass the input command to the OS, determine an identity for a resource that initiated the input command from the OS, obtain a policy associated with the identity, and enforce the policy to determine whether the input command should still be passed to the OS or blocked from the OS;
    intercept the input command before the OS receives the input command from the input peripheral,
    inspect a whitelist input command file and pass the input command to the OS for processing when the input command is matched in the whitelist input command file and when the one or more conditions associated with the policy for the identity of the resource indicate that the input command is to be processed by the OS and not passing the input command to the OS for processing even when the input command is matched in the whitelist and is authorized when the one or more conditions associated with the identity prohibit processing the input command, block and ignore the input command when the input command is unmatched in the whitelist input command file or when the input command is matched in the whitelist but the one or more conditions associated with the policy for the identity of the resource indicate that the input command is to be blocked from the OS, permit only authorized commands present in the whitelist and indicated as authorized by the one or more conditions to be processed by the OS, and change the authorized commands in the whitelist without modifying, compiling, and stopping execution of input peripheral agent, and enforcing changed authorized commands without rebooting the SST and without requiring any changes to a registry associated with the SST.

16. The SST of claim 15, wherein the input peripheral filter agent is further configured processing to: make the determination based on entries included in the whitelist input command file and based on the one or more conditions.

17. The SST of claim 15, wherein the SST is an Automated Teller Machine (ATM) and a remote network service accessible over a network connection to the ATM at least partially controls the entries of the whitelist input command file over the network connection.

* * * * *